(12) United States Patent
Jelloul et al.

(10) Patent No.: US 6,402,041 B2
(45) Date of Patent: Jun. 11, 2002

(54) FLUID FLOW CONTROL DEVICE HOUSED IN A THERMOSTATIC FAUCET

(75) Inventors: Eddy Jelloul, Abbeville; Frédéric Regnier, Yzengremer; Laurent Bongrand, Verneuil sur Igneraie, all of (FR)

(73) Assignee: Eurotherm Watts, S.A., Fressenneville (FR)

( * ) Notice: Subject to any disclaimer, the term of this patent is extended or adjusted under 35 U.S.C. 154(b) by 0 days.

(21) Appl. No.: 09/727,523

(22) Filed: Dec. 4, 2000

(30) Foreign Application Priority Data

Dec. 3, 1999 (FR) .............................................. 99 15247

(51) Int. Cl.[7] .............................................. G05D 23/13
(52) U.S. Cl. ................................................... 236/12.2
(58) Field of Search .................................. 236/12.2

(56) References Cited

U.S. PATENT DOCUMENTS

| | | | | |
|---|---|---|---|---|
| 4,029,256 A | * | 6/1977 | Dauga ........................ | 236/12.2 |
| 5,340,018 A | * | 8/1994 | MacDonald ................ | 236/12.2 |
| 5,931,374 A | * | 8/1999 | Knapp ........................ | 236/12.2 |
| 6,089,462 A | * | 7/2000 | Osvaldo ..................... | 236/12.2 |
| 6,279,831 B1 | * | 8/2001 | Lorch ......................... | 236/12.2 |

FOREIGN PATENT DOCUMENTS

| | | |
|---|---|---|
| EP | 0 566 433 A | 10/1993 |
| EP | 0 605 845 A | 7/1994 |
| EP | 1 022 634 A | 7/2000 |
| WO | WO 98 35280 A | 8/1998 |

* cited by examiner

Primary Examiner—William E. Tapolcai
(74) Attorney, Agent, or Firm—Edward J. Kondracki; Miles & Stockbridge P.C.

(57) ABSTRACT

The invention relates to a control device for controlling the flow of a fluid through a thermostatic faucet comprising a temperature control device (5) within the body of the faucet for controlling the outlet temperature of the fluid and comprising a thermosensitive element (3) and a flow control device (11) for controlling the flow from the faucet. The temperature control device includes a control knob (12) and the flow control device includes a control element (13). This control device is characterized in that the flow control device (11) is disposed downstream from the mixing chamber and controls the flow cross section of an outlet located downstream from the mixing chamber, and the control knob and control element are located on the same side of the body of the faucet that houses the control device, and on the opposite side from the outlet.

10 Claims, 4 Drawing Sheets

FLUID FLOW CONTROL DEVICE HOUSED IN A THERMOSTATIC FAUCET

FIELD OF THE INVENTION

The invention relates to a device for controlling the flow of a fluid, housed in a thermostatic faucet.

BACKGROUND OF THE INVENTION

Particularly in shower stalls, the valve that controls the flow of hot and cold water to the shower head or the faucet head must handle not only the on-off function but also the mixing of the hot water issuing from a hot water source with the cold water issuing from a cold water source in order to obtain water mixed to the temperature desired by the user.

There are exclusively mechanical control systems that consist of adjusting the cross-sections of the hot water and cold water passages.

These devices cannot correct the outlet temperature when the flow rate and/or the temperature of one of the two hot water/cold water conduits is accidentally modified.

There are other known devices in which the hot water/cold water mixture is controlled by means of a temperature-sensitive control element plunged into a so-called mixing chamber.

This control element automatically modifies the flow cross-sections of the hot water and cold water inlets into the mixing chamber by moving a piece that acts like a slide valve.

There are means that make it possible, by means of a control knob, to set reference value.

Thus, if the temperature of the water in the mixing chamber exceeds the threshold set by the reference value, the sensitive element shuts off the flow cross-section of the hot water passage in order to prevent burns.

A device of this type therefore controls the mixture of hot and cold water by automatically modifying the flow cross-section of the hot water and the cold water passages into the mixing chamber located downstream.

It is essential, however, to be able to stop the flow of the faucet when it is not in use.

It is therefore customary to house in the faucet both a temperature-sensitive mixing device and a device for controlling the opening and closing of the faucet, There are known devices wherein the body of the faucet houses a flow control device at one of its ends and an automatic temperature control device at its other end, these two devices being joined by a connecting conduit.

For purposes of control and/or adjustment, each of the devices has a control element located on one side of the body of the faucet for one of them, and on the other side for the other.

This makes it necessary to position the body parallel to the wall from which the hot water and cold water supply conduits project.

The flow control device can be positioned upstream or downstream from the temperature control device.

When the two conduits are combined, the opening/closing control device is generally disposed upstream from the device for controlling the mixture of the hot and cold water, in order to insulate the thermosensitive element when the faucet is not in use.

For example, the control device consists in a set of washers pierced with holes that in the open position, positions one washer relative to the other so that the holes of one washer line up with the holes of the other washer.

As a general rule, the flow control device works in an all-or-nothing way, meaning that it does not have any intermediate position, and the principle of these faucets consists of completely opening or closing the water inlets without the capability to control the flow rate.

In some cases, especially for faucets installed in sinks (EP-A-0.605.845 or EP-A-0.342.709), flow control may be provided, but this requires being able to modify the flow cross-sections of the hot water and cold water passages simultaneously, which requires complex hole shapes.

This is the case with the device in the document EP-1.022.634, wherein the set of disks is installed in such a way that it controls both the inflow of hot and cold water and the outflow of mixed water.

There is another known device (EP-0.566.433) wherein the thermosensitive element drives of one of the three disks in rotation, constituting a flow control means downstream from the mixing chamber.

An installation of this type is not appropriate because the mechanical stresses that are exerted on the thermosensitive element modify the position of the slide valve that controls the temperature.

The stresses are extremely undesirable because the amplitude of displacement of the slide valve is on the order of one millimeter, and even a slight modification interferes with the adjustment of temperature.

SUMMARY OF THE INVENTION

One of the objects of the invention is to obtain a device of the aforementioned type that specifically eliminates the aforementioned disadvantages.

The subject of the invention is a device for controlling the flow of a fluid from a faucet comprising:

housed in the body of the faucet:

a device for controlling the outlet temperature of the water, comprising a thermosensitive element which, plunged into a so-called mixing chamber, adjusts the temperature of the mixed water by modifying the cross-sections of flow to the mixing chamber of the hot water issuing from a hot water inlet and the cold water issuing from a cold water inlet, and a device for controlling the flow of the faucet, a control knob for the temperature control device and a control element for the flow control device located on the same side of the body of the faucet that houses the control device, and on the opposite side from the outlet, this device being characterized in that the means for transmitting the rotation of the control element is coaxial to the thermosensitive element and this means is a rotationally guided jacket housing the thermosensitive element, this jacket being rotationally coupled with the control element of the flow control device by a first coupling means, and rotationally coupled with the flow control device by a second

BRIEF DESCRIPTION OF THE DRAWINGS

The invention will be clearly understood with the help of the following description given as a non-limiting example, in reference to the attached drawing, which schematically represents.

DESCRIPTION OF THE PREFERRED EMBODIMENT(S)

Figure 1:
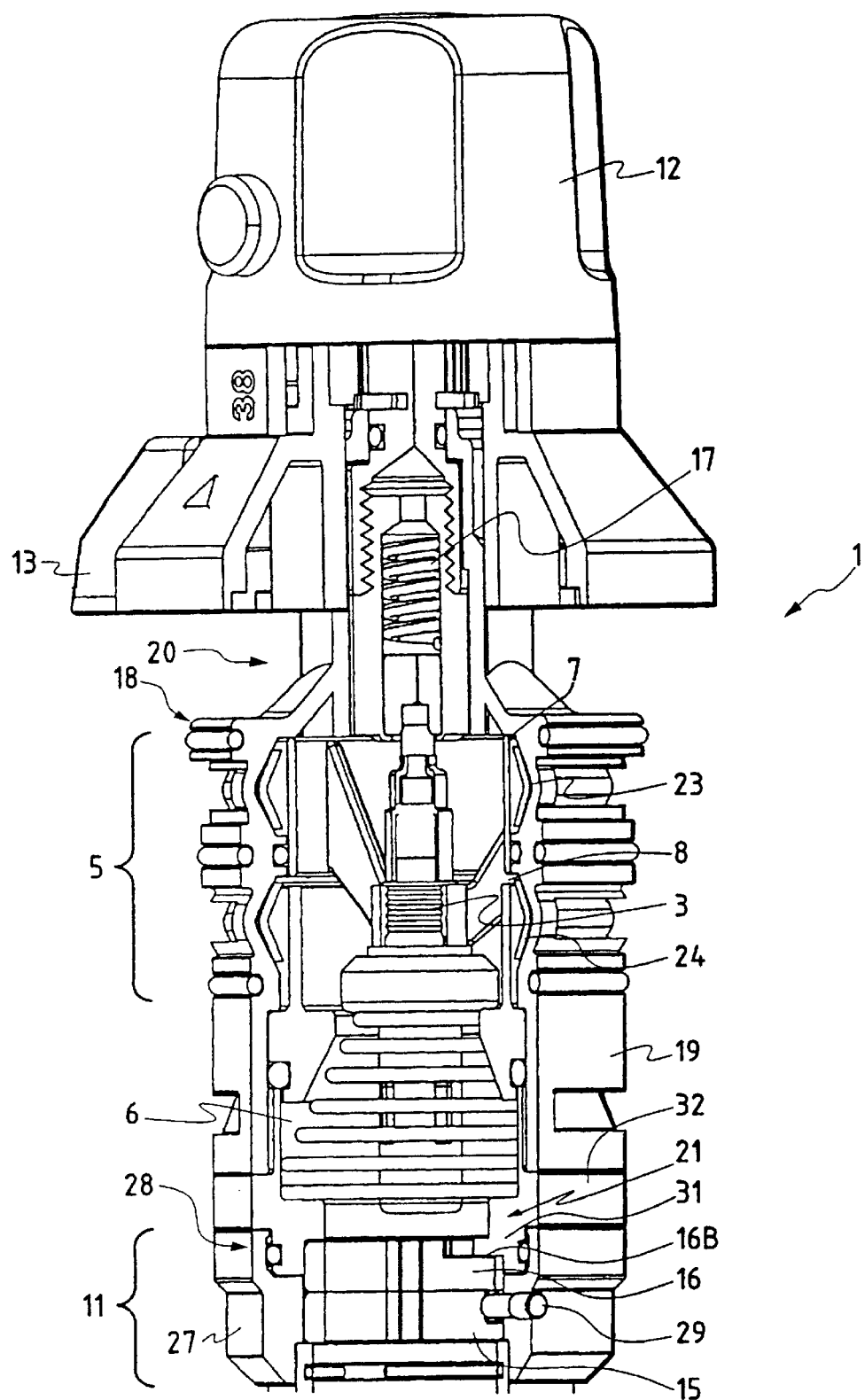
FIGS. 1 through 3: three partial longitudinal sections of a control device.
Figure 2:
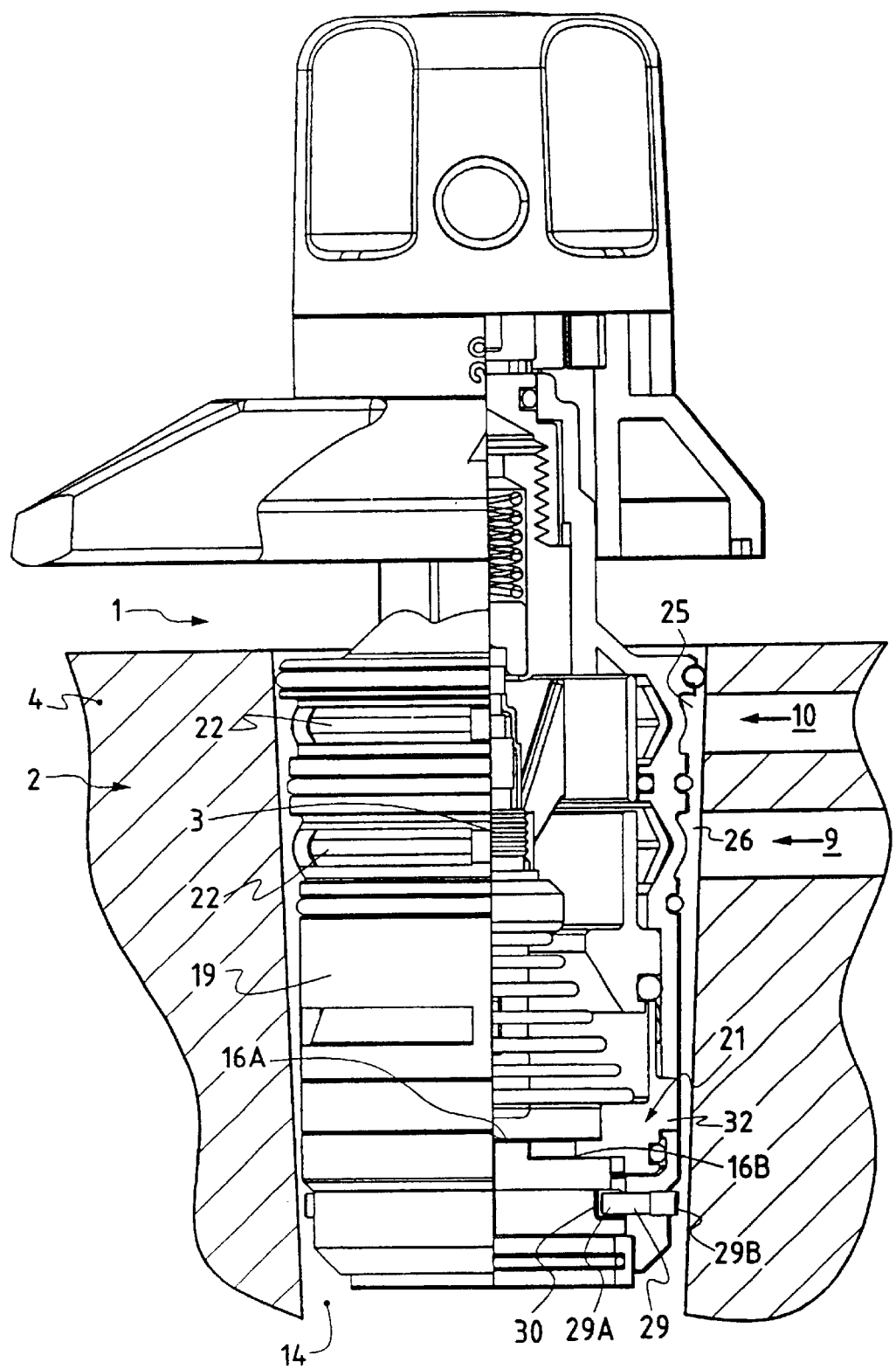

Referring to the drawing, we see a device 1 for controlling the flow of a fluid, housed in a thermostatic faucet 2.

This device specifically makes it possible to prevent burns in case of a sudden drop in the cold water pressure and is convenient to use because of the automatic adjustment of the outlet temperature of the water.

Conventionally, such a faucet with a thermostatic control element 3 comprises:

housed in the body 4 of the faucet:

a device 5 for controlling the outlet temperature of the water, comprising a thermosensitive element 3 which, plunged into a so-called mixing chamber 6, adjusts the temperature of the mixed water by modifying the cross-sections 7, 8 of flow to the mixing chamber 6 of the hot water issuing from a hot water inlet 9 and of the cold water issuing from a cold water inlet 10, and a device 11 for controlling the flow of the faucet, a control knob 12 for the temperature control device and a control element 13 for the flow control device.

The flow control device 11 is disposed downstream from the mixing chamber and controls the flow cross-section of the so-called outlet 14 located downstream from the mixing chamber.

Flow control is obtained by means of two washers 15, 16 disposed one on top of the other, each of which has at least one hole.

One (15) of the washers 15, 16, called the fixed washer, is rotationally immobilized, while the other washer (16), called the moving washer, is rotationally guided and rotationally driven, at least indirectly, by the control element 13 of the flow control device.

These washers 15, 16 are preferably ceramic.

Figure 4:
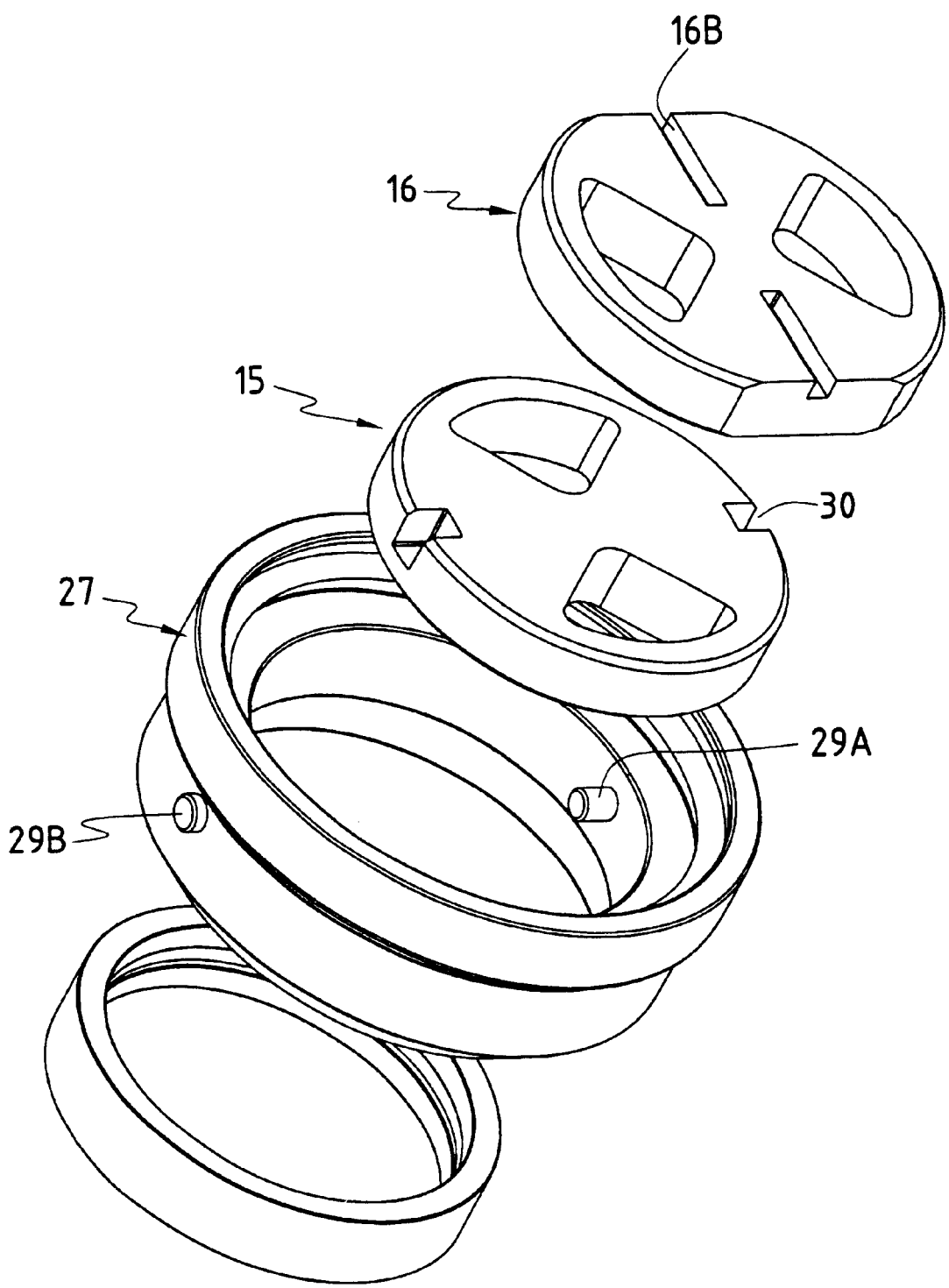
FIG. 4: an exploded view of a part of the control device.

As may be seen in FIG. 4, each washer is pierced with two holes, which essentially allow the outflow.

It is not equipped with a hole for introducing water into the mixing chamber.

Advantageously, the control knob and element are located on the same side of the body of the faucet that houses the control device, on the opposite side from the outlet 14 so that the means 17, 18 for transmitting the rotation of the control knob and element are coaxial.

They can also be coaxial to the sensitive element 3.

According to one characteristic of the invention, the temperature control device is housed in a rotationally guided jacket 19 inside the body of the faucet, and this jacket 19, which is rotationally coupled with the control element of the flow control device by a first coupling means 20 and rotationally coupled with the moving washer 16 by a second coupling means 21, at least partially constitutes the means 17 for transmitting the rotation of the moving washer.

The flow control device is disposed immediately at the outlet of the temperature control device, without a connecting conduit, which allows for a reduction in the overall dimensions.

This jacket 19 has two lateral slots 22 that allow the water issuing from the hot water and cold water inlets 9, 10 to enter the mixing chamber 6 via the hot water and cold water passages, whose cross-sections depend on the thermosensitive element.

The slots extend along nearly the entire circumference.

Advantageously, nonreturn valves 23, 24 in the form of rings with a substantially V-shaped cross-section prevent the return of the fluid to the hot and cold water inlets.

Facing these slots are annular chambers 25, 26 delimited by the outer surface of the jacket, the inner surface of the housing of the faucet receiving the flow control device, and gaskets 100, 101, 102.

Advantageously, the disk-shaped ceramic washers are mounted in a sleeve 27, which sleeve, at least indirectly, has means 28 for detachably connecting with the jacket 19 housing the temperature control device.

The rotational driving and/or rotational locking of one piece relative to another piece is achieved, for example, by means of cooperating shapes.

In the example shown, a pin 29 passes through the wall of the sleeve 27 housing the ceramic disks 15, 16 and one (29A) of the ends (29A, 29B) of this pin penetrates into a cavity 30 of the ceramic disk, while the other (29B) projects outward from the sleeve so as to cooperate with the body of the faucet, for example a notch in the body, thus rotationally locking the fixed disk inside the body of this faucet.

Quite clearly, the rotational locking of the fixed disk to the sleeve, and that of the sleeve to the body of the faucet, can be obtained with two separate pins, but the preceding solution is advantageous.

For the driving of the moving disk 16, which is located as close as possible to the mixing chamber 6, the disk has, for example in its side 16A that faces the mixing chamber, a recess 16B that receives a boss 31 presented at least indirectly by the jacket 19, which drives it in rotation.

Advantageously, the link between the moving disk and the jacket is produced by an intermediate ring 32 that is coupled with both the jacket 19 and the sleeve 27.

The temperature control device and the disks can therefore be replaced without requiring the replacement of the entire assembly.

Furthermore, the presence of the jacket makes it possible to produce a cartridge, i.e. a pre-assembled piece comprising the temperature control device and the flow control device disposed one behind the other, which need only be slid into the body of the faucet and is therefore easily replaceable.

The diameter of the intermediate ring and the sleeve are quite clearly no larger than the diameter of the jacket.

Another advantage results from a possible enlargement of the mixing chamber, which allows a much better mixture of the hot and cold water because it prevents the formation of hot or cold streams, and hence a better control of the temperature.

The hot water and cold water inlets are embodied by channels that pass radially through the housing of the faucet.

In reality, many faucet manufacturers produce only the body of the faucet, in which they install flow control devices and/or temperature control devices that they purchase on the market.

They must therefore allow for the specific technical and dimensional characteristics of the existing devices.

Thus, they use a cartridge that may be equipped with the flow control device.

In order limit production costs, one need only provide for the bodies of the faucets to have a bore that is long enough to house both devices, even if only one device is installed in it.

Figure 3:
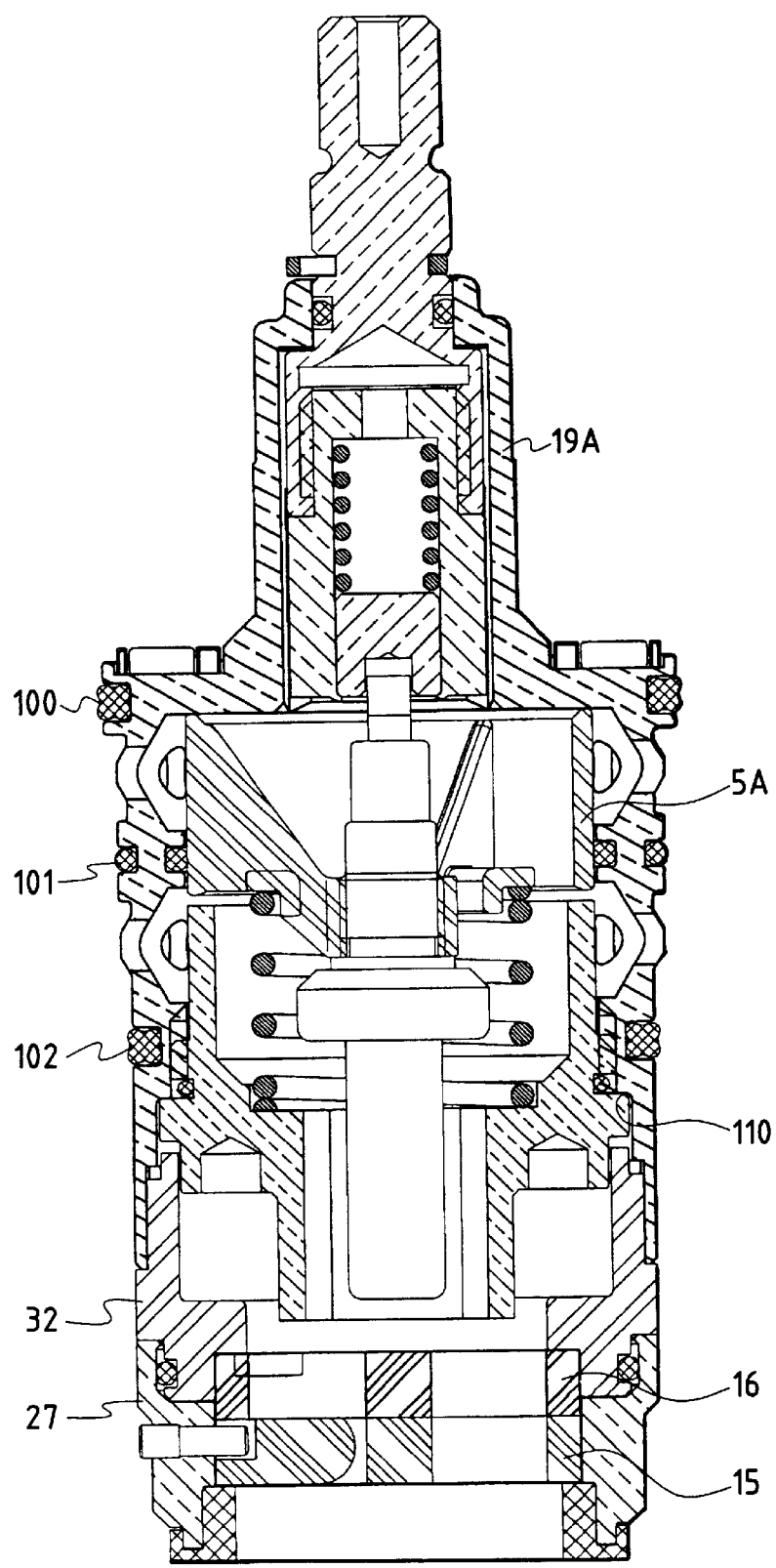

FIG. 3 shows that the temperature control device 5 is placed at the end of a bore, resting against a supporting surface 110.

The slide valve 5A controls the inflow of hot and cold water.

Positioned in front of this temperature control device is the ring 32 that locks the temperature control device, to which the flow control device can be adapted.

The jacket 19 is extended on the other side of the part housing the intermediate ring by a jacket 19A housing the stem for controlling the temperature setting.

The flow control element is attached to this jacket.

The system is easy to produce.

While this invention has been described in conjunction with specific, embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A control device for controlling a flow of a fluid through a thermostatic faucet having a body (4) with a cold fluid inlet (10) and a hot fluid inlet (9), comprising:

a temperature control device (5) within the body (4) for controlling an outlet temperature of the fluid, said device (5) comprising a mixing chamber (6) and a thermosensitive element (3) adapted to be plunged into the mixing chamber (6) to adjust the temperature of mixed fluid by modifying cross-sections (7,8) of flow to the mixing chamber (6) to hot fluid issuing from a hot fluid inlet (9) and a cold fluid issuing from a cold fluid inlet (10), a flow control device (11) disposed downstream from the mixing chamber and adapted to adjust a flow cross section of an outlet (14) downstream from the mixing chamber for controlling the flow of the faucet, a control knob (12) connected to the temperature control device and a control element (13) connected to the flow control device and located on a same side of the body of the faucet that houses the temperature control device, and on an opposite side from the outlet (14), a rotationally guided jacket (17) coaxial to the thermosensitive element for transmitting rotation of the control element (13), said rotationally guided jacket (19) housing the thermosensitive element (3), and first and second coupling means, said jacket (19) being rotationally coupled with the control element of the flow control device by said first coupling means (20), and rotationally coupled with the flow control device (11) by said second coupling means.

2. A control device according to claim 1, further comprising:

a fixed washer (15) and a moveable washer (16) disposed within the flow control device (11), one on top of the other, each of which has at least one hole, and the fixed washer being rotationally immobilized, while the moveable washer (16) is rotationally guided and rotationally driven, at least indirectly, by the control element (13) of the flow control device so as to control flow.

3. A control device according to claim 1, characterized in that the jacket (19) has lateral slots (22) that allow fluid issuing from the hot fluid and cold fluid inlets (9, 10) to enter the mixing chamber (6) via hot fluid and cold fluid passages, whose flow cross-section depends on the thermosensitive element (3).

4. A control device according to claim 1, characterized in that the flow control device and the temperature control device form a cartridge.

5. A control device according to claim 2, characterized in that the fixed washer and the moveable washer are ceramic disks (15, 16) mounted in a sleeve (27), said sleeve including, at least indirectly, means (28) for detachably connecting the temperature control device with the jacket (19) housing.

6. A control device according to claim 2, characterized in that an intermediate ring (32) coupled with the jacket (19) and with a sleeve (27) provides a link between the moveable washer and the jacket.

7. A control device according to claim 1, characterized in that they moveable washer (16) has in a side (16A) that faces the mixing chamber, a recess (16B) that receives a boss (31) presented at least indirectly by the jacket (19), which rotatably drives the moveable washer (16) located adjacent to the mixing chamber (6).

8. A control device according to claim 1, wherein the cold fluid inlet and hot fluid inlet are separated from the outlet by the mixing chamber.

9. A control device according to claim 1, wherein the flow control device is detachably connected to the temperature control device.

10. A control device for controlling a flow of a fluid through a thermostatic faucet having a body (4) with a cold fluid inlet (10) and a hot fluid inlet (9), comprising:

a temperature control device (5) within the body (4) for controlling an outlet temperature of the fluid, said device (5) comprising a mixing chamber (6) and a thermosensitive element (3) adapted to be plunged into the mixing chamber (6) to adjust the temperature of mixed fluid by modifying cross-sections (7,8) of flow to the mixing chamber (6) to hot fluid issuing from a hot fluid inlet (9) and a cold fluid issuing from a cold fluid inlet (10), a flow control device (11) disposed downstream from the mixing chamber and adapted to adjust a flow cross section of an outlet (14) downstream from the mixing chamber for controlling the flow of the faucet, a control knob (12) connected to the temperature control device and a control element (13) connected to the flow control device and located on a same side of the body of the faucet that houses the temperature control device, and on an opposite side from the outlet (14), a rotationally guided jacket (17) coaxial to the thermosensitive element for transmitting rotation of the control element (13), said rotationally guided jacket (19) housing the thermosensitive element (3), and first and second coupling means, said jacket (19) being rotationally coupled with the control element of the flow control device by said first coupling means (20), and rotationally coupled with the flow control device (11) by said second coupling means a pin (29) extending through the sleeve (27), said sleeve (27) housing the ceramic disks (15, 16), one first end (29A) of the pin (29) penetrating into a cavity (30) of a ceramic disk, and a second other end (29B) of the pin (29) projecting outward from the sleeve so as to cooperate with the body (4) of the faucet.

* * * * *